United States Patent [19]

Eness

[11] Patent Number: 5,307,370
[45] Date of Patent: Apr. 26, 1994

[54] SECURE CORDLESS RADIO-TELEPHONE
[75] Inventor: Orville M. Eness, Park Ridge, Ill.
[73] Assignee: Motorola, Inc., Schaumburg, Ill.
[21] Appl. No.: 709,523
[22] Filed: Jun. 3, 1991
[51] Int. Cl.[5] .................... H04L 27/30; H04M 11/00
[52] U.S. Cl. .......................................... 375/1; 380/6;
     380/9; 380/34; 380/46; 380/49; 379/61
[58] Field of Search .................. 380/6, 9, 23, 33, 34,
     380/49, 21, 43, 46, 54; 375/1; 379/61, 62

[56]         References Cited
         U.S. PATENT DOCUMENTS

| 4,560,832 | 12/1985 | Bond et al. ........................ 380/33 |
| 4,654,481 | 3/1987  | Corris et al. ...................... 379/62 |
| 4,727,568 | 2/1988  | Morishima ........................ 380/6 X |
| 4,829,540 | 5/1989  | Waggener, Sr. et al. ............ 375/1 |
| 4,905,272 | 2/1990  | Van de Mortel et al. .......... 379/62 |
| 5,073,932 | 12/1991 | Yossifor et al. .................... 380/23 |
| 5,077,790 | 12/1991 | D'Amico et al. .................. 380/23 |
| 5,115,463 | 5/1992  | Moldavsky et al. ............... 379/61 X |

Primary Examiner—Bernarr E. Gregory
Attorney, Agent, or Firm—Timothy W. Markison

[57]  ABSTRACT

A frequency-hopping cordless telephone system is described which adds digitized audio to a pseudorandom frequency hopping pattern for voice encryption. The randomly selected start point of a very long pseudoramic pattern generator is transferred to the handset by way of an infrared path at each off-hook. In addition, the infrared path is used to synchronize the clocks of the handset and the associated base module when the cordless telephone is in an on-hook position.

19 Claims, 3 Drawing Sheets

FIG. 1

SECURE CORDLESS RADIO-TELEPHONE

FIELD OF THE INVENTION

This invention relates generally to communication systems and in particular to a method that allows secure transmission of information between a handset and an associated base module of a cordless radio-telephone.

BACKGROUND OF THE INVENTION

Cordless radio-telephones, which may be used in a trunked, conventional, or cellular-telephone communication system, are known to comprise a handset and an associated base module. Typically information is transceived between the handset and the associated base module via an RF communication path. The associated base module transfers this information to the communication system which allows an operator of a cordless radio-telephone to communicate with almost any telephone in the world. The information transferred between the communication system and the associated base may be encrypted to provide for a secure transmission of the information within the communication system. However, the conveyance of information between the handset and the associated base module is generally not secure making it possible to eavesdrop on a person's conversation.

For a person who desires privacy and security while using his or her cordless radio-telephone, the above mentioned presents a serious problem. The problem is further illustrated by the fact that an eavesdropper does not have to be in close proximity to the person using a cordless radio-telephone to intercept transmissions between a handset and an associated base module. A typical cordless radio-telephone has a transmission range of up to one quarter of a mile between the handset and the associated base module. Therefore, a need exists for a method and apparatus that provides for secure transmission of information between the handset and the associated base module of a cordless radio-telephone.

SUMMARY OF THE INVENTION

These needs and others are substantially met by the secure cordless radio-telephone disclosed herein. In a radio-telephone that comprises a handset and an associated base module, information is transmitted between the handset and the associated base module from time to time via a first communication path. The information is transmitted in a secure manner by transmitting security information regarding the first communication path via a second communication path and utilizing the security information to establish a secure conveyance of information between the handset and the associated base module.

In an aspect of the present invention, the second communication path is a light modulated path, the first communication path is an RF path, and the security information comprises an initial value for a random number sequence. Both the handset and the associated base module comprise an adder to add the random number sequence to the information which produces secure information.

BRIEF DESCRIPTION OF THE DRAWINGS

FIG. 1 illustrates a partial schematic of the associated base module and the handset that incorporates the present invention.

DESCRIPTION OF A PREFERRED EMBODIMENT

In general, the secure cordless radio-telephone provides for secure transmission of information between the handset and the associated base module. This is accomplished when the handset is picked up off the associated base module (physical contact is broken between them). As physical separation is sensed, an initial frequency of a frequency hopping sequence is transmitted from the associated base module to the handset via an infrared (IR) path. The IR path has a relatively short transmission range, less than a couple of feet, such that an unnoticed interception of the initial frequency is virtually impossible. By transmitting the initial frequency to the handset, the frequency hopping sequence circuits of both the handset and the associated base module are beginning the frequency hopping sequence at exactly the same point. After a short synchronization procedure, information that is conveyed between the handset and associated base module via a radio frequency (RF) communication path is coded by adding the frequency hopping sequence to it. Typically, the information conveyed is voice signals, however, data signals may also be conveyed. When the handset or the associated base module receives coded, or secure, information, the frequency hopping sequence is removed from the coded information leaving only the original information. This process continues throughout a phone conversation. When the conversation ends and the handset is placed in physical contract with the associated base module, the coding process stops. At this time, the frequency hopping sequence is scrambled such that when the next conversation begins, the frequency hopping sequence will start at a random frequency and not where it left off at the conclusion of the preceding conversation. While the handset and associated base module are in physical contact, synchronization information is conveyed via the IR path to insure that the clocks in both the handset and the associated base module remain in sync.

Figure 1:
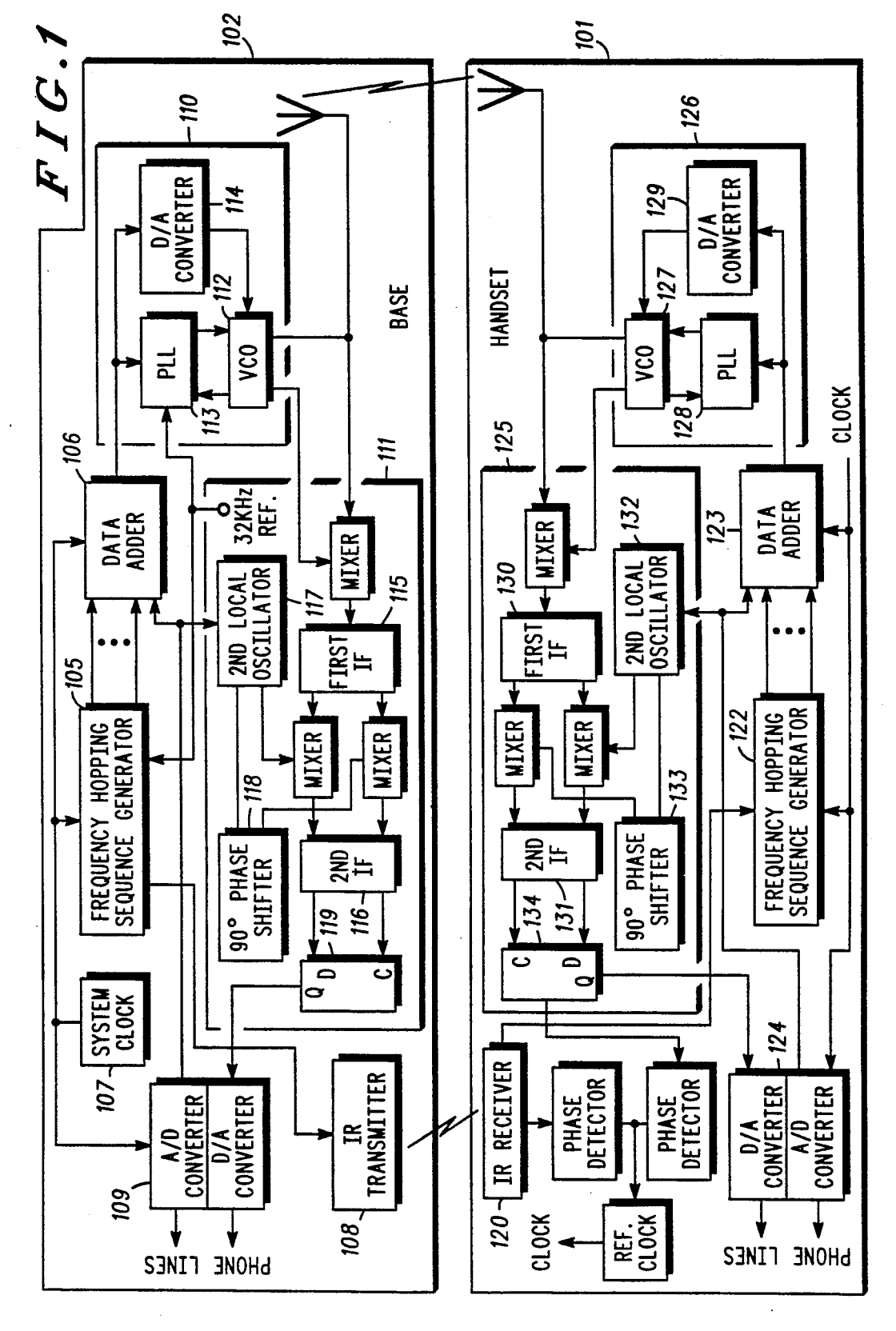
Figure 2:
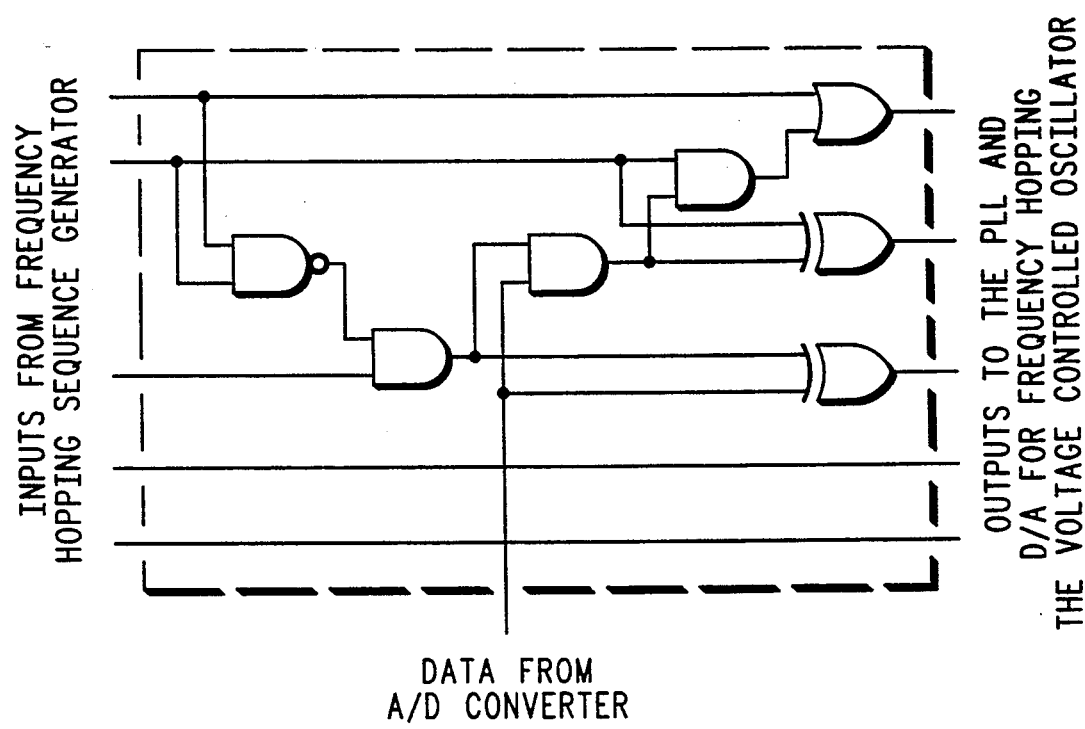
FIG. 2 illustrates an adder in accordance with the present invention for adding the random number sequence to the information to produce the secure information.

The present invention will now be discussed in detail with reference to FIGS. 1-3. FIG. 1 illustrates a cordless radio-telephone that comprises a handset (101), an associated base module (102), a first communication path (103), and a second communication path (104). The associated base module (102) comprises a random number generator (105), a data adder (106) (FIG. 2 illustrates an implementation of the adder (106 & 123)), a system clock (107) which syncs the clock dependant components in the associated base module, an infrared (IR) transmitter (108), an A/D & D/A converter (109) for coupling to a phone line, or similar source, a local receiver section (110), and a local transmitter section (111). The handset (101) comprises an IR receiver (120), a reference clock (121) which syncs clock dependant components in the handset, a random number generator (122), an adder (123), an A/D & D/A converter (124), a local receiver section (125), and a local transmitter section (126).

The cordless radio-telephone of FIG. 1 operates in two modes; one when telephone conversation is taking place and the other when a conversation is not taking place. When a conversation is not taking place, the handset and the associated base module are typically in close physical proximity, usually touching. During this time, the clocks of the handset (101) and the associated base module (102) are synchronized via the second communication path (104). This occurs at the moment a conversation ends. When the handset (101) is placed on-hook, i.e. placed in physical contact with the associated base module (102), the battery charge current changes which is sensed by the associated base module (102). Upon sensing the change, the associated base module (102) stops the frequency hopping generator (105), performs a random hop in the frequency hopping sequence, and modifies the IR path (104). The IR path is modified by opening and closing a few switches (not shown) such that clock synchronization data may be transmitted as opposed to frequency hopping information. The clock synchronization information keeps the handset clock in step with the associated base module clock (107).

The associated base module (102) stops the frequency hopping sequence of the frequency hopping sequence generator (105) by any convenient means such as a disable signal. The frequency hopping sequence generator, or random number generator, (105) may be a shift register having a long non-repeating pattern in excess of eight to ten hours and enough outputs to give the desired number of frequency hops. It is contemplated that the frequency hopping sequence generator (105) will have five outputs to produce 32 different frequency hops. In addition to stopping the frequency hopping sequence, the associated base module will set a few stages of the frequency hopping sequence generator without affecting the rest of the stages to randomly change the initial frequency for the next frequency hopping sequence.

When a conversation begins, the associated base module senses an off-hook condition such as the battery charge current changing. At this time, the associated base module starts the frequency hopping sequence, modifies the IR path (104), and keeps the IR transmitter (108) on long enough to transfer the initial frequency of the frequency hopping sequence to the handset (<50 ms). The handset (101) senses off-hook initiation from battery charge current interruption and modifies its IR receiver (120) to receive the initial frequency as opposed to clock synchronization information. The handset routes the initial frequency to its frequency hopping sequence generator (122), which is identical to the frequency hopping sequence generator (105) of the associated base module (102), and begins its frequency hopping sequence in the same spot as the associated base module. Once the frequency hopping sequence begins in the handset (101), the handset (101) compares its frequency hopping sequence with the frequency hopping sequence being received from the associated base module. If the frequency hopping sequences don't match, the handset (101) adjusts its frequency hopping sequences and recompares the sequences. After the frequency hopping sequences are in step, the frequency hopping sequence generator (122) is restored to normal, free running, operation. If, however, the sequences don't get in step within a time-out period (50 mSec to 100 mSec), the cordless radio-telephone acts as a non-secure phone, i.e. as if no coding mechanisms were involved.

Once the frequency hopping sequences are in step, the cordless radio-telephone is ready to convey secure information between the handset (101) and the associated base module (102). Assuming that the phone call is an incoming call such that information, which may be audio or data, will be received from the phone line first, is received by the associated base module (102). The associated base module converters the received information to digital information, and serially feeds it to the adder (106) at a rate of approximately 32 KHz. The adder (106) adds the digital information with the frequency hopping sequence to produce secure, or coded, information. The local transmitter (111) of the associated base module modulates the coded information with an RF carrier frequency in the range of about 900 MHz to 920 MHz utilizing a voltage controlled oscillator (VCO) (112), a phase locked loop (PLL) (113), and a D/A converter (114). The PLL (113) and VCO (112) are of standard implementation with the PLL divide number changed for each digital bit along with a D/A converter stepping the VCO to nearly each correct frequency, allowing the PLL to slowly track a clock rate such as the 32 KHz clock rate mentioned above.

The local receiver (125) of the handset (101) receives the coded information via the first communication path (103). The local receiver (125) demodulates the coded information using a first intermediate frequency (130), a second intermediate frequency (131), a second local oscillator (132), a 90 degree phase shifter (133), and a D flip-flop (134). This arrangement allows the D-flip-flop to toggle for one output when the incoming 1st I.F. signal is above the 2nd L.O. and reverses when the incoming signal is below. The demodulated data is then processed through the D/A and passed out to the speaker of the handset (not shown).

The process for sending coded information from the handset (101) to the associated base module (102) is substantially identical to the process described above. The local transmitter (126) of the handset (101) modulates the coded information to an RF carrier frequency in the range of about 900 MHz to 920 MHz utilizing a voltage controlled oscillator (127), a phase locked loop (128), and a D/A converter (129). The modulated information is transmitted, via the first communication path (103), to the local receiver of the associated base module (102). The local receiver (110) demodulates the modulated information using a first intermediate frequency (115), a second intermediate frequency (116), a second local oscillator (117), a 90 degree phase shifter (118), and a D flip-flop (119). As the modulated information is being demodulated, the 2nd L.O. (117) is stepped down to keep the local receiver (110) properly tuned each time the local transmitter (111) is stepped up in frequency. This is slightly different from the handset (101) which steps up the 2nd L.O. (131).

Figure 3:
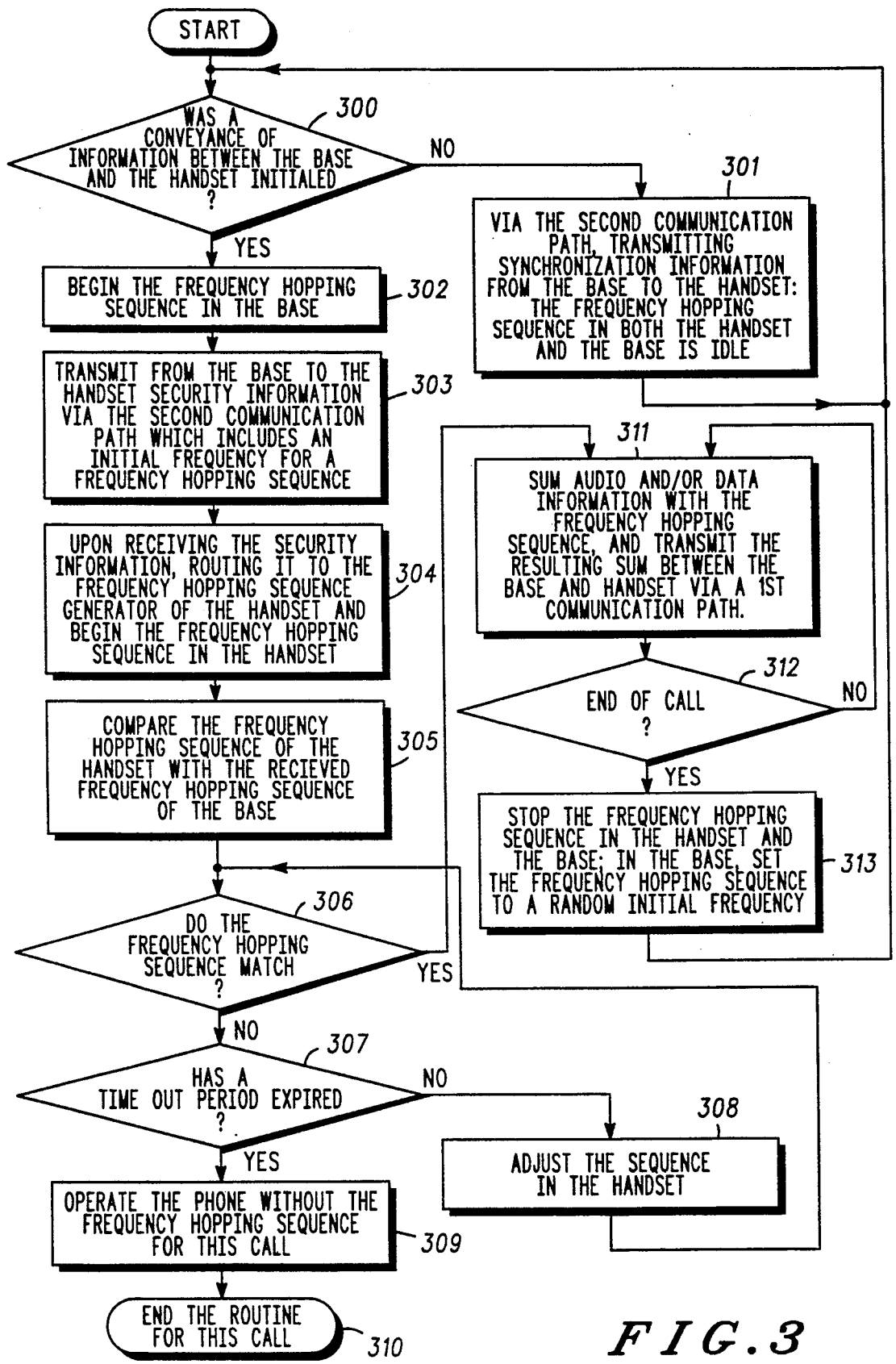
FIG. 3 illustrates a logic diagram that may be used to implement the present invention.

FIG. 3 illustrates a logic diagram that implements the present invention. At step 300, the associated base module determines whether a conveyance of information has been initiated. As mentioned above, this may be accomplished by detecting changes in the battery charge current. If a conveyance has not been detected (300), clock synchronization information is transmitted between the associated base module and the handset via the second communication path to keep the clocks in step (301). Once a conveyance is detected (300), the associated base module begins the frequency hopping sequence (302) and transmits security information which comprises an initial frequency to the handset via the second communication path (303). As the security information is received by the handset, the frequency hopping generator of the handset is initiated at the initial frequency received within the security information (304). The handset compares the frequency hopping sequence its producing with the frequency hopping sequence being received (305). If the frequency hopping sequences match (306), the frequency hopping sequence is added to the data and transmitted between the handset and the associated base module via the first communication path (311). The conveyance of secure, or coded, information via the first communication path continues to the call ends. Once the call ends (312), the frequency hopping sequence stops and a random initial frequency is entered into the frequency hopping sequence generator of the associated base module (313), then the process continues at step 300.

If the frequency hopping sequences do not match (306), the process determines if a time out period has expired (307). The time out period may be any length, but to minimize delay in service, it should be about 50 mSec to 100 mSec in duration. If the time out period has expired (307), the conveyance of information between the handset and the associated base module will commence, but the information will not be coded (309). Under these conditions, the information will be uncoded for the duration of the phone call. Alternatively, if the frequency hopping sequencies do not match during a time out period, the handset continues to try and get a match until the operator of the cordless radio-telephone terminates the call. If the time out period has not expired (307), the handset makes an adjustment in its frequency hopping sequence and then does the comparison again (306). This process continues until the time out period expires or the frequency hopping sequences are in step.

The above described invention is intended for mass production, easy installation, and use. As a goal, the present invention is contemplated to be placed on a substrate to form an IC. It is further contemplated that at least the frequency hopping sequence generator, the adder, and the second communication path will be placed on the substrate. In addition, the security information transmitted via the second communication path may comprise more that the initial frequency of the frequency hopping sequence. For example, it could comprise frequency hopping sequence. For example, it could comprise frequency rate of the clocks, which encoding circuits to use, and which encryption key to use.

I claim:

1. A method for providing secure transmission of information between a handset and an associated base module, wherein the information is transceived, from time to time, between the handset and the associated base module via a first communication path, the method comprises the steps of:
   a) transmitting security information regarding the first communication path via a second communication path; and
   b) utilizing the security information to establish a substantially secure conveyance of information between the handset and the associated base module on the first communication path.

2. In the method of claim 1 the handset and the associated base module are in proximate physical contact when not transceiving information, the method of claim 1 further comprises transmitting synchronization information between the handset and the associated base module via the second communication path.

3. The method of claim 2 further comprises, upon physical separation of the handset and the associated base module, transmitting the security information via the second communication path.

4. In the method of claim 1 the security information comprises data identifying an initial value for a random number sequence, step (b) further comprises summing the random number sequence with the information prior to transmitting the information via the first communication path to produce secure information.

5. The method of claim 4 further comprises subtracting the random number sequence from the secure information upon receiving the secure information.

6. The method of claim 4 further comprises, at the conclusion of information transmission, altering the initial value of the random number sequence when the handset and the associated base module are placed in substantially physical contact.

7. The method of claim 4, wherein the random number sequence repeats at an interval greater than eight hours.

8. The method of claim 1, wherein the second communication path comprises a light modulation path.

9. The method of claim 1, wherein the first communication path comprises an RF modulation path.

10. An improved cordless radio-telephone that includes a handset, an associated base module, and a first communication path for transmitting information between the handset and the associated base module, the improvement comprises:
   second communication path means for establishing a second communication path between the handset and the associated base module and for transmitting security information between the handset and the associated base module; and
   security information means, operably associated with the second communication path means, for utilizing the security information to provide substantially secure transmission of information, via the first communication path, between the handset and the associated base.

11. In the improved cordless radio-telephone of claim 10, the second communication path means comprises a light modulation path that has a transmission range substantially less than that of the first communication path.

12. In the improved cordless radio-telephone of claim 10, the security information comprises an initial value for a random value sequence.

13. In the improved cordless radio-telephone of claim 12, the security information means further comprises means for synchronizing the transmission of secure information between the handset and the associated base module.

14. In the improved cordless radio-telephone of claim 12, the security information means further comprises addition means for summing the information with the random number sequence to produce secure information.

15. In the improved cordless radio-telephone of claim 14, the security information means further comprises substraction means for subtracting the random number sequence for the secure information when the secure information is received.

16. In the improved cordless radio-telephone of claim 12, the security information means further comprises means for altering the initial value when the transmission of information is completed and when the handset and the associated base module are placed in substantial physical contact.

17. A security apparatus for providing secure transmission of information, via a first communication path, between a handset and an associated base module of a cordless radio-telephone, the security apparatus comprises:
   random sequence generation means for generating a random sequence and for producing security information;
   addition means, operably coupled to the random sequence generation means, for adding the random sequence to information; and
   second communication path means, operably associated with the random sequence generation means, for conveying the security information between the associated base module and the handset.

18. The security apparatus of claim 17 further comprises synchronization means, operably coupled to the second communication path means, for synchronizing the associated base module and the handset when the associated base module and the handset are in substantial physical contact.

19. The security apparatus of claim 17 further comprises a substrate whereon the random sequence generation means, the addition means, and the second communication path means are deposited.

* * * * *